May 2, 1933.    G. W. LOWE    1,907,300

TRUSS PAD

Filed April 8, 1931

INVENTOR,
Geo. W. Lowe;
BY F. E. Maynard,
ATTORNEY.

Patented May 2, 1933

1,907,300

UNITED STATES PATENT OFFICE

GEORGE W. LOWE, OF LOS ANGELES, CALIFORNIA

TRUSS PAD

Application filed April 8, 1931. Serial No. 528,526.

This invention relates to surgical trusses and more especially to pad devices therefor.

It is an object of the invention to provide a truss pad which includes a central hernia supporting cushion which is a spongy bed whose bottom is backed up by a stiffer base which presents a marginal rim of flexible character by which the cushion may be very firmly but detachably secured to a holder, which, in turn, may be suitably fastened to a truss frame of any approved type.

There is thus provided a rupture support whose cushion is adapted to be replaced from time to time and which may be dismounted and thoroughly cleansed so as to be kept in a perfectly sanitary condition.

A further object is to provide a pad structure including a cushion attached to its holder by a rim flange in a manner to provide a clear surrounding space between the side of the cushion and its holder whereby to produce a material vacuum when the pad device is in place at the rupture.

Especially it is an object to provide a cushion which will not crumple down, and fail in its intended purpose, under the pressure of the extruding rupture part.

The invention contains certain advancements in this art as set forth in the ensuing disclosure and having, with the above, additional objects and advantages, and whose construction, combination and details of means, and manner of operation will be made manifest in the description of the herewith illustrative embodiment; it being understood that modifications, variations and adaptations may be resorted to within the scope, principle and spirit of the invention as it is more directly claimed hereinafter.

Figure 1:
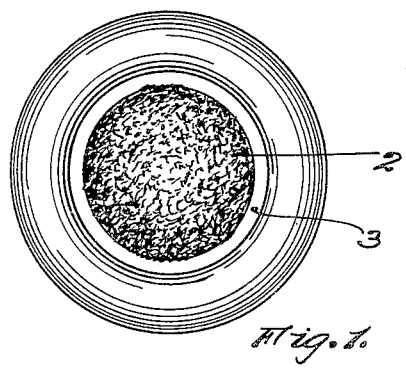
Figure 1 is a plan of the pad device.
Figure 2:
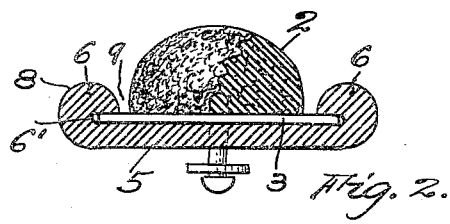
Figure 2 is a cross-section thereof; partly in elevation.
Figure 3:
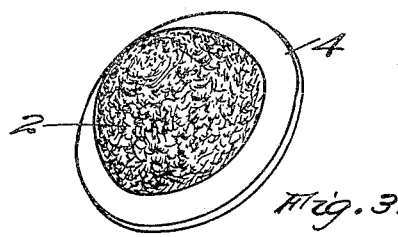
Figure 3 is a perspective of the detached cushion.

In its preferred embodiment the device includes a central, more or less hemispherical solid, but elastic, cushion 2 whose flat base is adhesively secured to a base 3 provided with a flexible rim 4. This base may be of desirably stiff rubber sheet; while the cushion is preferably of "sponge-rubber" stock, which is desirable because it becomes harder as it beds down under the pressure of the protruding rupture part and thus offers a firmer support as this is needed, and if the part recedes then the cushion correspondingly expands.

The cushion is attached to an annular holder which includes a back 5 of stiff rubber and has a semi-circular top bead 6 which is under-channeled at 6' in the plane of the back 5 so that the rim 4 may be snugly tucked under the bead and held thereby. The top of the bead is rounded at 8 where it takes bearing against the skin about the zone of the rupture orifice.

The size of the cushion 2 is such as to leave a deep space 9 between it and the bead 6 and when the pad is pressed into effective position about the rupture the flesh flows into the space and dispels the air, and a vacuum holding effect is acquired which greatly aids holding the pad in place.

There is thus provided the advantage of a firm, but not rigid pad member over the hernia; a simple and readily cleanable pad device, and the capacity for effecting a vacuum grip on the skin.

What is claimed is:

The combination with a truss pad having an annular bead around its perimeter and which bead has an undercut channel at the plane of the face having the bead; of a removable cushion device comprising a body of sponge rubber of a diameter less than that of the inner side of the bead, and an attaching base to which said body is secured and which is comprised of flexible rubber and projects beyond the body and is adapted to be worked into the said channel to interlock therein, a margin of the base being exposed around the applied body and the body and the bead forming an annular cavity whereby to produce a vacuum effect when the pad is pressed against the surface of the skin of a ruptured part.

GEO. W. LOWE.